United States Patent
Sun et al.

(10) Patent No.: US 12,001,456 B2
(45) Date of Patent: Jun. 4, 2024

(54) MUTUAL EXCLUSION DATA CLASS ANALYSIS IN DATA GOVERNANCE

(71) Applicant: International Business Machines Corporation, Armonk, NY (US)

(72) Inventors: Chun Hua Sun, Beijing (CN); Xu Bin Cai, Beijing (CN); Xiaobo Wang, Beijing (CN); Yi Wang, Beijing (CN); Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 17/654,858

(22) Filed: Mar. 15, 2022

(65) Prior Publication Data

US 2023/0297596 A1 Sep. 21, 2023

(51) Int. Cl.
*G06F 16/00* (2019.01)
*G06F 16/22* (2019.01)
*G06F 16/28* (2019.01)

(52) U.S. Cl.
CPC .......... *G06F 16/285* (2019.01); *G06F 16/221* (2019.01)

(58) Field of Classification Search
CPC .. G06F 16/248; G06F 16/2423; G06F 16/951; G06F 3/0484; G06F 3/0481; G06F 16/20; G06F 16/21; G06F 16/26; G06F 16/284; G06F 7/00; G06F 16/313; G06F 16/353; G06F 40/20; G06F 40/117; G06F 11/302; G06F 11/3438; G06F 16/144; G06F 16/2282; G06F 16/23; G06F 16/2393; G06F 16/2456; G06F 16/24564; G06F 16/24565; G06F 16/328; G06F 16/285; G06F 40/174; G06F 16/22; G06F 18/285; G06F 40/216; G06F 11/0727; G06F 11/0793;
(Continued)

(56) References Cited

U.S. PATENT DOCUMENTS 8,036,997 B2  10/2011  Garrity et al.
9,665,628 B1   5/2017  Dubey et al.
(Continued)

FOREIGN PATENT DOCUMENTS

CN  106815221 A  6/2017
CN  111383732 A  7/2020
CN  112783633 A  5/2021

OTHER PUBLICATIONS

Gonzalez et al., "An Incremental Approach to Address Big Data Classification Problems Using Cognitive Models," Cognitive Computation, No. 11, Jun. 20, 2019, pp. 347-366. https://link.springer.com/article/10.1007/s12559-019-09655-x.
(Continued)

*Primary Examiner* — Shyue Jiunn Hwa
(74) *Attorney, Agent, or Firm* — Yee & Associates, P.C.

(57) ABSTRACT

Performing a mutual exclusion data class analysis is provided. A data class group of a plurality of data class groups that a matching data class is a member of is identified. The matching data class matches data in a plurality of rows of a column in a data asset. Data classes included in the data class group that the matching data class is a member of are identified. A mutual exclusion data class is filtered from the data class group to form a filtered data class group for the column. The filtered data class group is run against the column of the data asset decreasing processing time and resource utilization of a computer.

20 Claims, 8 Drawing Sheets

(58) Field of Classification Search
CPC ............. G06F 16/211; G06F 16/24522; G06F 16/24578; G06F 16/258; G06F 16/93; G06F 16/958; G06F 18/253; G06F 18/254; G06F 3/0482; G06F 40/177; G06F 40/18; G06F 40/284; G06F 7/20; G06F 18/24; G06F 16/58; G06F 16/907; G06F 18/213; G06F 18/214; G06F 18/217; G06F 18/23; G06F 18/23211; G06F 18/2415; G06F 18/2431; G06F 18/2148; G06F 18/2155; G06F 18/24133; G06F 16/221; G06F 16/2379; G06F 16/636

See application file for complete search history.

(56) References Cited

U.S. PATENT DOCUMENTS

| | | | | |
|---|---|---|---|---|
| 2002/0022956 | A1* | 2/2002 | Ukrainczyk | G06F 40/20 707/E17.084 |
| 2012/0271845 | A1* | 10/2012 | Netz | G06F 16/244 707/769 |
| 2016/0357903 | A1* | 12/2016 | Shendure | G06N 20/00 |
| 2019/0095173 | A1* | 3/2019 | Kaufman | G06F 16/284 |
| 2021/0026872 | A1* | 1/2021 | Saillet | G06F 16/248 |
| 2021/0081435 | A1 | 3/2021 | Kabra et al. | |

OTHER PUBLICATIONS

"Data classification in the InfoSphere Information Analyzer thin client," InfoSphere Information Server, 11.7, accessed Dec. 2, 2021, Copyright IBM Corporation 2007, 2019; 17 pages. https://www.ibm.com/docs/en/iis/11.7?topic=client-data-classification.

"Matching data (Watson Knowledge Catalog)," IBM Cloud Paks, IBM Cloud Pak for Data, 3.0.1, accessed Dec. 2, 2021, Copyright IBM Corporation 2020, 2021; 7 pages. https://www.ibm.com/docs/en/cloud-paks/cp-data/3.0.1?topic=classes-matching-data.

Hassanat, "Two-point-based binary search trees for accelerating big data classification using KNN," PLOS One, Nov. 26, 2018, 15 pages. https://journals.plos.org/plosone/article?id=10.1371/journal.pone.0207772.

PCT International Search Report and Written Opinion, dated Jun. 19, 2023, regarding Application No. PCT/IB2023/051517, 7 pages.

\* cited by examiner

DATA CLASS
SCORING PROCESS
500

| DATA ASSET ID (502) | COLUMN ID (504) | DATA CLASS (506) | DATA CLASS SCORE FOR MATCHING ROWS OF COLUMN (508) | REFERENCED COLUMNS (SAME COLUMNS IN DIFFERENT DATA ASSETS) (510) |
|---|---|---|---|---|
| TABLEA | COLUMN1 | DC1 | 50000 | [COLUMN 9,10,11] |
| TABLEA | COLUMN1 | DC2 | 3000 | [ ] |
| TABLEA | COLUMN2 | DC5 | 60000 | [COLUMN 21, 22] |
| TABLEA | COLUMN2 | DC6 | 2000 | [ ] |
| TABLEA | COLUMN3 | DC7 | 10 | [ ] |
| ◦◦◦ | ◦◦◦ | ◦◦◦ | ◦◦◦ | ◦◦◦ |
| TABLEA | COLUMNZ | DC... | 19000 | |

FIG. 5

COLUMN DATA CLASS
ANALYSIS RESULT
700

| DATA ASSET ID (702) | COLUMN ID (704) | IDENTIFIED DATA CLASS FOR COLUMN (706) |
|---|---|---|
| TABLEA | COLUMN1 | DATE (85%) |
| TABLEA | COLUMN2 | CITY (96%) |
| TABLEA | COLUMN3 | STATE (100%) |
| TABLEA | COLUMN4 | IDENTIFIER (100%) |
| TABLEA | COLUMN5 | ACCOUNT NUMBER (89%) |
| ◦◦◦ | ◦◦◦ | ◦◦◦ |

MUTUAL EXCLUSION DATA CLASS ANALYSIS IN DATA GOVERNANCE

BACKGROUND

1. Field

The disclosure relates generally to data governance and more specifically to performing a mutual exclusion data class analysis in data governance by building data class groups, which are used to identify mutual exclusion data classes that are not needed to be run on a particular column of data, to improve system performance during classification of data in columns of a data asset.

2. Description of the Related Art

Data governance is a set of processes, roles, policies, standards, metrics, and the like, which ensures effective and efficient utilization of data to enable an entity, such as, for example, an enterprise, company, business, organization, institution, agency, or the like, to achieve its goals. Data governance also ensures the quality and security of the data used across the entity. For example, data governance defines who can take what action, upon what data, in what situations, using what processes. In other words, data governance manages data during its life cycle, from acquisition, to use, to disposal. In addition, data governance involves complying with external standards set by industry associations, government agencies, and the like. Effective data governance ensures that data cannot be misused, tampered with, or stolen.

In data governance, data classification plays an important role, especially for column analysis in database management systems or file management systems. One current data governance mechanism provides a feature of data classes, which can be used to automatically detect data classes for data asset columns. A data class describes the type of data contained in a column of a data asset, such as, for example, a data table, flat data file, rectangular data file, or the like. A data class may be, for example, a name, address, city, date, account number, credit card number, or the like.

This current data governance mechanism analyzes the data or metadata of a data asset and then uses a specialized classifier (e.g., machine learning model) to detect the probable data class for that data. However, this current data classification mechanism takes a long time to identify the correct data class and has performance issues when analyzing a large volume of data (e.g., big data). For example, in a customer scenario, it may take several days to analyze X number of columns in big data. In theory, if X number of columns exists in a data table and N number of data classes exists in a system, then the system has to process each column by N number of existing data classes. Thus, the total data classification analysis job for the system will be (X*N) *(data size), which equals a heavy system workload in terms of time and processing costs.

SUMMARY

According to one illustrative embodiment, a computer-implemented method for performing a mutual exclusion data class analysis is provided. A computer identifies a data class group of a plurality of data class groups that a matching data class is a member of. The matching data class matches data in a plurality of rows of a column in a data asset. The computer identifies data classes included in the data class group that the matching data class is a member of. The computer filters a mutual exclusion data class from the data class group to form a filtered data class group for the column. The computer runs the filtered data class group against the column of the data asset decreasing processing time and resource utilization of the computer. According to other illustrative embodiments, a computer system and computer program product for performing a mutual exclusion data class analysis are provided.

In addition, the illustrative embodiments run the filtered data class group against referenced columns that contain same data as the column in other data assets managed by the computer. As a result, the illustrative embodiments improve performance of the computer, itself, by decreasing processing time and resource utilization of the computer when running filtered data class groups against columns of data assets and referenced columns containing the same data as the columns in other data assets managed by the computer.

BRIEF DESCRIPTION OF THE DRAWINGS

FIG. 5 is a diagram illustrating an example of a data class scoring process in accordance with an illustrative embodiment;

FIG. 7 is a diagram illustrating an example of a column data class analysis result in accordance with an illustrative embodiment.

DETAILED DESCRIPTION

Figure 1:
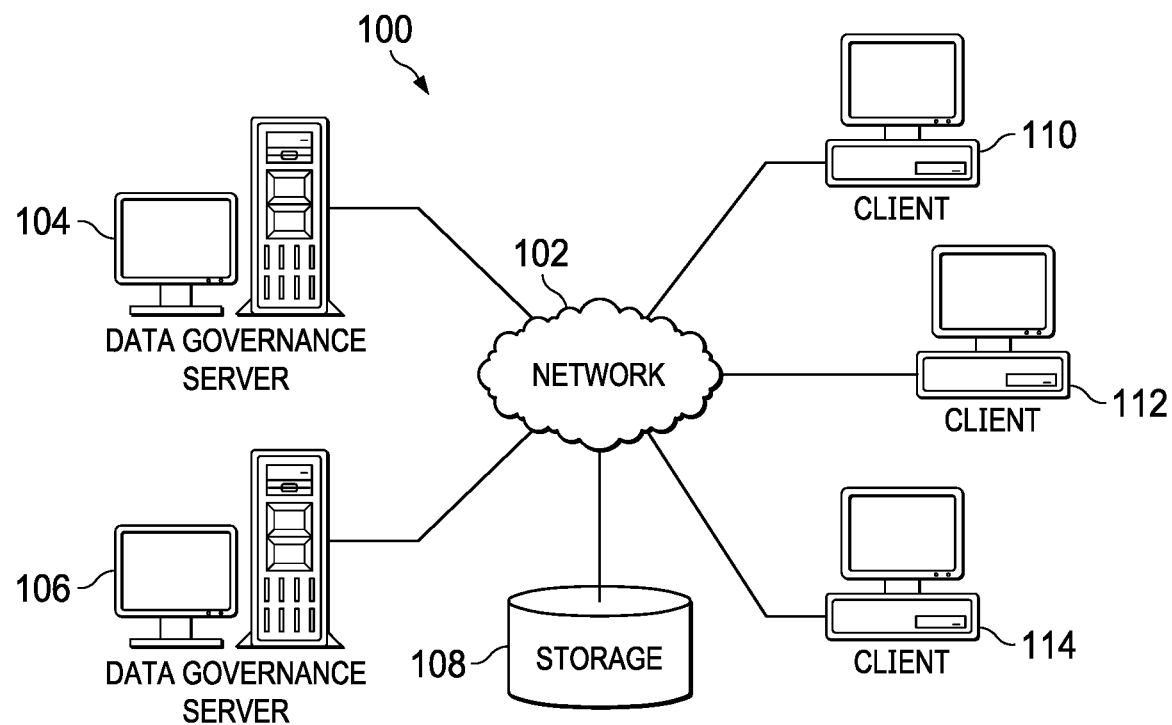
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
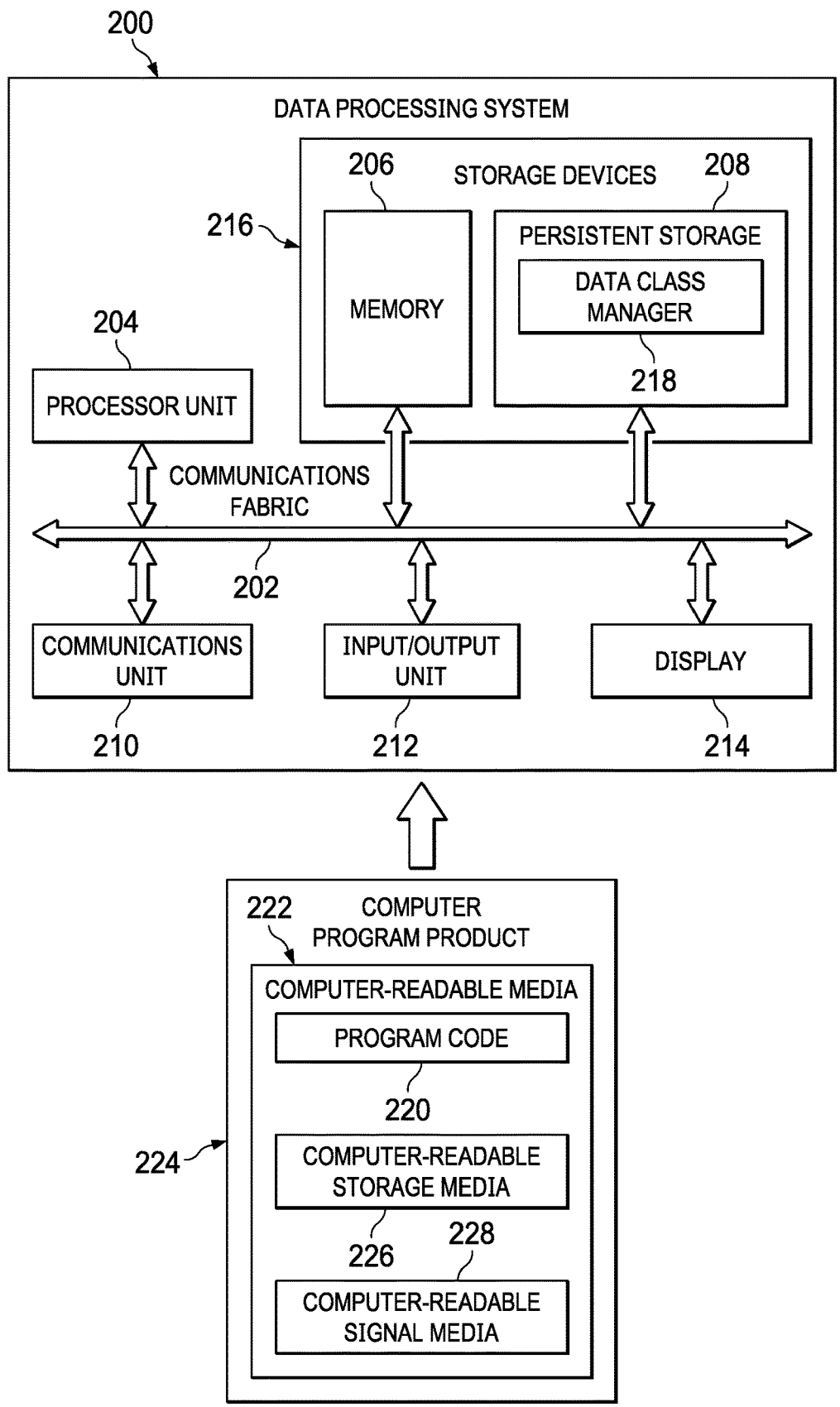
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, data governance server 104 and data governance server 106 connect to network 102, along with storage 108. Data governance server 104 and data governance server 106 may be, for example, server computers with high-speed connections to network 102. Also, data governance server 104 and data governance server 106 may each represent a cluster of servers in one or more data centers. Alternatively, data governance server 104 and data governance server 106 may each represent multiple computing nodes in one or more cloud environments.

In addition, data governance server 104 and data governance server 106 provide data governance services for a plurality of data assets corresponding to a set of subscribing entities. Further, data governance server 104 and data governance server 106 perform a mutual exclusion data class analysis by building data class groups, which data governance servers 104 and 106 utilize to identify mutual exclusion data classes in the data assets that are not needed to be run on particular columns of data, to improve performance of data governance servers 104 and 106 while performing data classification jobs.

Data classes describe the type of data, such as, for example, name, street address, city, zip code, phone number, account number, credit card number, social security number, social security number last 4, insurance number, email address, network IP address, product, quantity, code, and the like, contained in columns of a particular data asset. A data asset is any source of data worked with as a unit, such as, for example, a relational data table, a structured data file, a flat data file, a rectangular data file, a data table view, or the like. A data catalog can provide a set of predefined data classes for data class analysis of the data assets. A data catalog is a detailed inventory of all data assets corresponding to an entity.

Data classification is the process of assigning a data class to respective columns of data in a data asset during a data class analysis job. Data governance server 104 and data governance server 106 assign the data classes, which are predefined, to the columns of the data asset. Data governance server 104 and data governance server 106 can also categorize or organize data classes into different data class groups. For example, all of the data classes comprising a particular data class group may be related to date or time and include data classes such as a date data class, a first date format data class (e.g., MM-DD-YYYY), a second date format data class (e.g., MM/DD/YYYY), a date of birth data class, a timestamp data class, and the like. Furthermore, data governance server 104 and data governance server 106 can utilize data classes to mask data according to defined policies and regulations.

Data governance server 104 and data governance server 106 build the data class groups to identify mutually exclusive data classes to prevent data governance server 104 and data governance server 106 from running a mutually exclusive data class on a particular column of a data asset, thereby improving performance of data governance server 104 and data governance server 106 in terms of decreased processing time and resource utilization while performing data classification jobs. Data governance server 104 and data governance server 106 also select a data class group to run against a particular column based on data class scores corresponding to that particular column. For example, data governance server 104 and data governance server 106 may select the data class group that includes data classes having the highest data class scores for that particular column. Further, it should be noted that data governance server 104 and data governance server 106 do not need to standardize any data asset to perform a data class analysis.

Client 110, client 112, and client 114 also connect to network 102. Clients 110, 112, and 114 are client devices of data governance server 104 and data governance server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to request data classification analysis of the data assets managed by data governance server 104 and data governance server 106.

Storage 108 is a network storage device capable of storing a data asset in a relational or structured format. In addition, storage 108 may represent a plurality of network storage devices. Further, data governance server 104 and data governance server 106 manage the data assets stored in storage 108. Furthermore, storage 108 may store other types of data, such as authentication or credential data that may include usernames, passwords, and the like associated with, for example, system administrators, security analysts, data scientists, and client device users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on data governance server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as data governance server 104 in FIG. 1, in which computer-readable program code or instructions implementing the mutual exclusion data class analysis processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores data class manager 218. However, it should be noted that even though data class manager 218 is illustrated as residing in persistent storage 208, in an alternative illustrative embodiment, data class manager 218 may be a separate component of data processing system 200. For example, data class manager 218 may be a hardware component coupled to communication fabric 202 or a combination of hardware and software components. In another alternative illustrative embodiment, a first set of components of data class manager 218 may be located in data processing system 200 and a second set of components of data class manager 218 may be located in a second data processing system, such as, for example, data governance server 106 in FIG. 1.

Data class manager 218 controls the process of performing a mutual exclusion data class analysis in data governance by building data class groups. Data class manager 218 utilizes the data class groups to identify mutually exclusive data classes that are not needed to be run on particular columns of data in a data asset. By not running mutual exclusion data classes on columns, data class manager 218 improves performance of data processing system 200 by decreasing processing time and system resource utilization while performing data classification jobs on data assets.

As a result, data processing system 200 operates as a special purpose computer system in which data class manager 218 in data processing system 200 enables identification of mutually exclusive data classes within data class groups that are not needed to be run on particular columns of data assets. In particular, data class manager 218 transforms data processing system 200 into a special purpose computer system as compared to currently available general computer systems that do not have data class manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Figure 3:
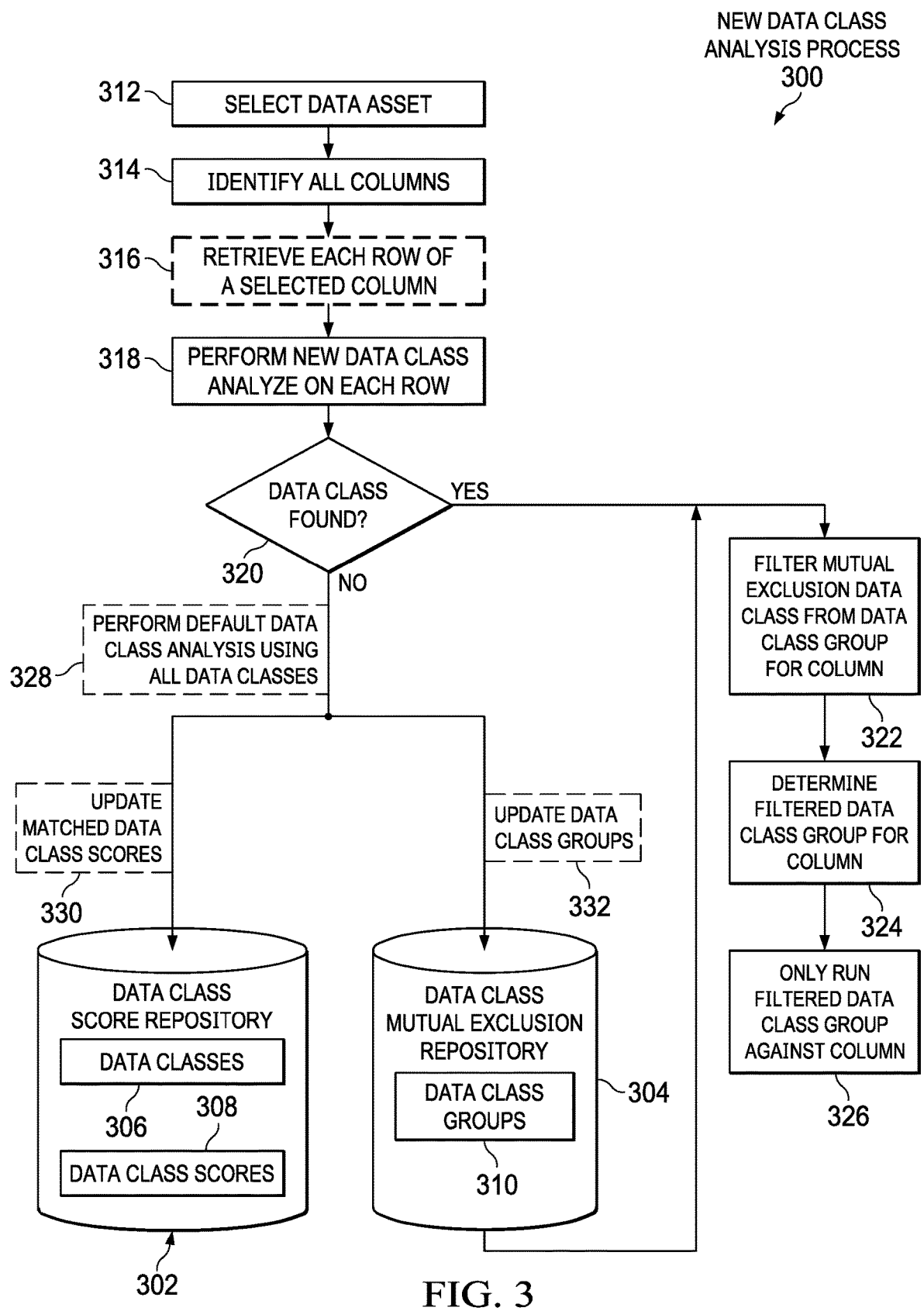
FIG. 3 is a diagram illustrating an example of a new data class analysis process in accordance with an illustrative embodiment.

With reference now to FIG. 3, a diagram illustrating an example of a new data class analysis process is depicted in accordance with an illustrative embodiment. New data class analysis process 300 may be implemented in a computer, such as, for example, data governance server 104 in FIG. 1 or data processing system 200 in FIG. 2. For example, new data class analysis process 300 may be implemented in data class manager 218 in FIG. 2.

In this example, new data class analysis process 300 includes data class score repository 302 and data class mutual exclusion repository 304. Data class score repository 302 and data class mutual exclusion repository 304 may be located, for example, in persistent storage, such as persistent storage 208 in FIG. 2, or in storage, such as storage 108 in FIG. 1. Data class score repository 302 includes data classes 306 and data class scores 308. Data classes 306 represent a plurality of predefined data classes that designate or describe the type of data contained in columns of data assets. Data class scores 308 represent numerical scores of data classes 306 that correspond to different columns of data in the data assets. Data class mutual exclusion repository 304 includes data class groups 310. Data class groups 310 represent a plurality of different groups of related data classes. Data class groups 310 also identify pairs of mutually exclusive data classes and pairs of relevant or applicable data classes within data class groups.

At 312, the data class manager of illustrative embodiments first selects a data asset (e.g., a relational data table comprised of columns and rows) managed by the system (e.g., data governance server 104 in FIG. 1 or data processing system 200 in FIG. 2) for data classification in response to a user input received from a client device via a network (e.g., client 110 via network 102 in FIG. 1). At 314, the data class manager identifies and retrieves all columns of the selected data asset. At 316, the data class manager then retrieves each respective row of a selected column in the data asset. At 318, the data class manager performs the new data class analysis by retrieving all data classes in data class score repository 302 that correspond to the selected column. For example, the data class manager may retrieve data classes for the selected column based on corresponding data class scores. The data class manager orders matching data classes for this column by data class score (i.e., number of rows containing data in this column that match a particular data class) according to data class scores 308. For example, if a particular row of the selected column matches a particular data class, then the data class manager increments the data class score corresponding to that column by 1 for that particular data class. In other words, the data class score is based on the number of rows in that column that match that particular data class.

At 320, the data class manager determines whether a matching data class was found for this column based on the new data classification analysis. The data class manager may utilize a set of matching mechanisms to specify matching criteria to match a data class to a particular column of the data asset. For example, the data class manager may utilize a dictionary of valid values to determine when a row value of a column belongs to a particular data class. The data class manager may also utilize valid values from a reference data set to determine when a row value of a column belongs to a particular data class. In addition, the data class manager may utilize a regular expression to determine when a row value of a column belongs to a particular data class. Further, the data class manager may utilize logic specified in a Java class to determine when a row value of a column or a column as a whole belongs to a particular data class. It should be noted that the data catalog can also provide a predefined set of Java classes. Furthermore, the data class manager may utilize a data class confidence threshold level. For example, the data class confidence threshold level represents the minimum confidence value that a particular data class candidate should have on a particular column in order for the data class manager to assign that particular data class to that particular column.

In response to the data class manager determining that a matching data class (e.g., DC1) was found for this column, yes output of 320, the data class manager identifies which particular data class group that the matching data class is a member of (e.g., DC Group1) using listing of data class groups 310 stored in data class mutual exclusion repository 304. The data class manager then identifies all data classes contained in that particular data class group (e.g., DC Group1 comprises DC1, DC2, and DC5). Moreover, the data class manager determines whether two data classes in that particular data class group have an exclusive relationship (e.g., DC1 and DC2 have a mutual exclusion relationship). In other words, if DC1 is a match for that column, then the data class manager will not run DC2 against that particular column saving time and system resources, which improves system performance. In response to the data class manager determining that two data classes in that particular data class group have an exclusive relationship, the data class manager, at 322, filters the mutual exclusion data class (e.g., DC2) in that particular data class group. At 324, the data class manager determines a filtered data class group (e.g., filtered DC Group1 now only comprises DC1 and DC5) for that particular column. As a result, at 326, the data class manager only runs the filtered data class group (e.g., DC1 and DC5) against that particular column. Moreover, the data class manager can run the filtered data class group on any referenced columns, which contain the same data as that particular column, but are included in other data assets managed by the data class manager. While running the filtered data class group against that particular column, the data class manager updates the data class scores for that particular column in data class score repository 302. It should be noted that illustrative embodiments do not utilize machine learning or artificial intelligence methods to perform new data class analysis process 300.

Thus, illustrative embodiments provide one or more technical solutions that overcome a technical problem with current solutions that take a long time to perform data classification jobs especially when processing a large volume of data creating a heavy system workload in terms of time and resource costs. As a result, these one or more technical solutions provide a technical effect and practical application in the field of data governance.

In responsive to determining that no matching data class was found for this column in data class score repository 302 (i.e., no data class for this column is defined in data class score repository 302), no output of step 320, the data class manager, at 328, performs a default or existing data class analysis, which runs all of the data classes in data classes 306 (e.g., 165 total data classes) against each respective row of this column. The data class manager then identifies a final data class for this column after running all of the data classes of data classes 306 (e.g., all 165 data classes) against each and every row of this column. In addition, at 330, the data class manager updates data class scores for matched data classes against this column in data class score repository 302. Further, at 332, the data class manager also updates data class groups 310 in data class mutual exclusion repository 304 based on result of the default data class analysis.

Figure 4:
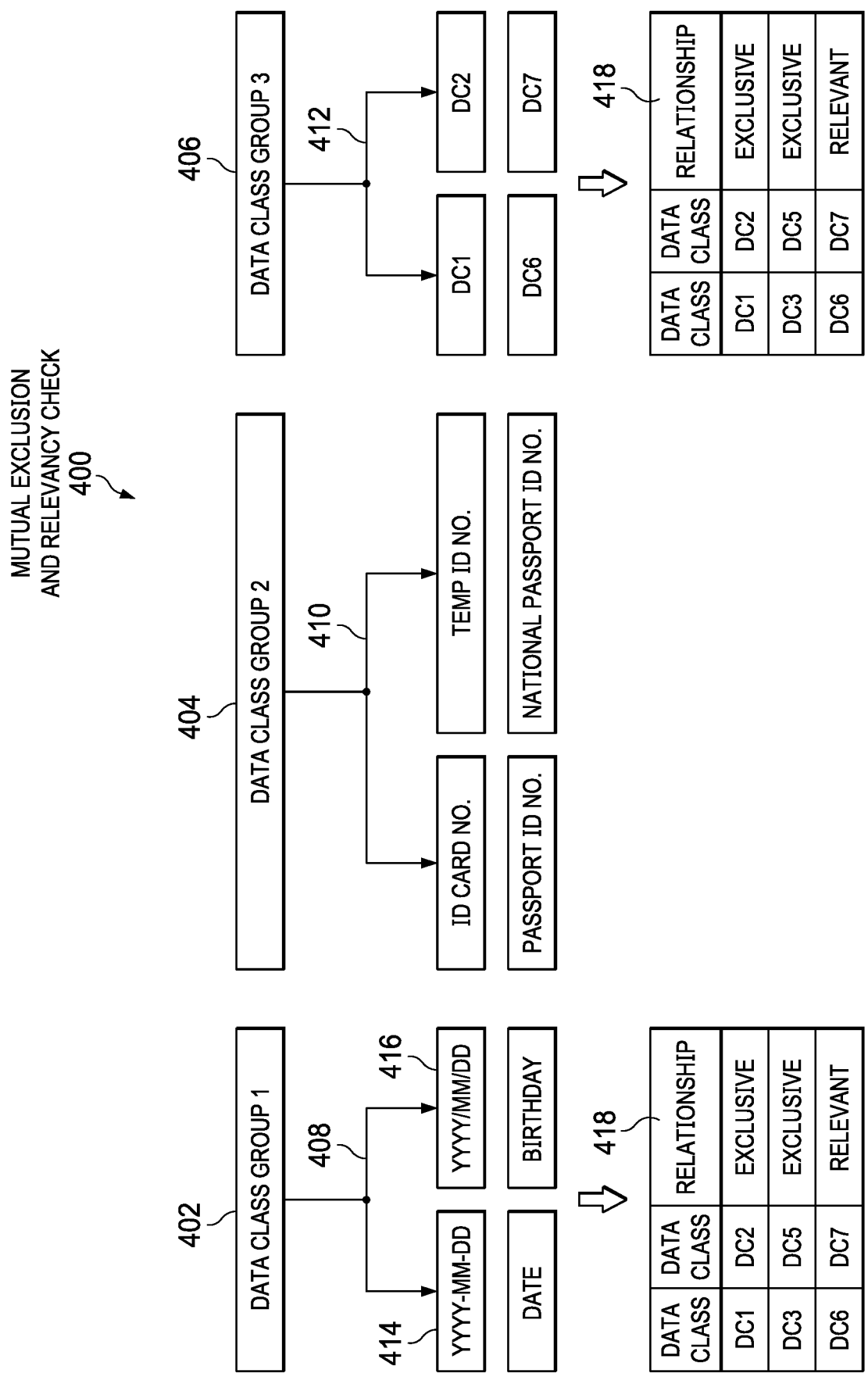
FIG. 4 is a diagram illustrating an example of a mutual exclusion and relevancy check in accordance with an illustrative embodiment.

With reference now to FIG. 4, a diagram illustrating an example of a mutual exclusion and relevancy check is depicted in accordance with an illustrative embodiment. Mutual exclusion and relevancy check 400 may be implemented in a computer, such as, for example, data governance server 104 in FIG. 1 or data processing system 200 in FIG. 2. For example, mutual exclusion and relevancy check 400 may be implemented in data class manager 218 in FIG. 2.

In this example, mutual exclusion and relevancy check 400 includes data class group 1 402, data class group 2 404, and data class group 3 406. However, it should be noted that data class group 1 402, data class group 2 404, and data class group 3 406 are meant as examples only and not as limitations on illustrative embodiments. In other words, any number of data class groups may exist in the system. Data class group 1 402, data class group 2 404, and data class group 3 406 may be included in, for example, data class groups 310 in FIG. 3.

In this example, data class group 1 402 includes data classes 408, data class group 2 404 includes data classes 410, and data class group 3 406 includes data classes 412. Each of data classes 408, data classes 410, and data classes 412 comprise 4 data classes. However, it should be noted that data class group 1 402, data class group 2 404, and data class group 3 406 may be comprised of any number of data classes.

Also in this example, data classes 408 of data class group 1 402 include data class 414 and data class 416. Data class 414 has a data format of "YYYY-MM-DD" and data class 416 has a data format "YYYY/MM/DD". The data class manager identifies data class 414 and data class 416 as mutually exclusive data classes because each data class contains the same information but in a different format. For example, even though data class 414 may match data in a particular column of a data asset, data class 416 will not match the data in that particular column because of its different data format. As a result, the data class manager will not run data class 416 against that same column because of the mutual exclusion, saving time and resources. In other words, an exclusive relationship exists between two data classes when a first data class matches a particular column and the data class manager will not run the second data class against that particular column because the first data class and the second data class describe a same type of data even though in a different format and running both the first and second data classes against that particular column would be redundant, which would waste time and resources. The data class manager would identify the second data class as a mutual exclusion data class that would not be run against that particular column.

As an illustrative scenario, assume that 165 data classes are predefined in the system. However, it should be noted that 165 data classes are meant as an example only and that any number of predefined data classes may exist in the system. The 165 data classes may be, for example, data classes 306 in FIG. 3. Further, assume the 165 data classes are separated into 20 different data class groups either manually by a user or automatically by the data class manager based on historical data class group information. As a result, in this illustrative scenario a data class group may contain approximately 8 different data classes. For example, a data class group may contain DC1, DC2, DC3, DC5, DC6, DC7, DC9, and DC11. Further, the data class manager determines that DC1 and DC2 have an exclusive relationship according to the information contained in relationship table 418. Relationship table 418 may be included in a data class mutual exclusion repository, such as, for example, data class mutual exclusion repository 304 in FIG. 3.

Based on the information in relationship table 418, if data in a column matches DC1, then that data will not match DC2. As a result, in response to the data in the column matching DC1, the data class manager will not run DC2 against that particular column of data because of the mutual exclusion between DC1 and DC2. Furthermore, the data class manager determines that DC6 and DC7 have a "relevant" relationship based on the information in relationship table 418. For example, if data in a column matches DC6, then that data may also match DC7. As a result, in response to the data in the column matching DC6, the data class manager will also run DC7 against that column of data as well.

It should be noted that when the data class manager utilizes the default data class analysis on columns, the data class manager does not utilize any data class groups. As a result, the data class manager runs all 165 data classes against each and every row of data in each respective column of the data asset being analyzed. In contrast, the data class manager utilizes data class groups when performing the new data class analysis of illustrative embodiments. When performing the new data class analysis, if the data class manager determines that 2 data class groups (e.g., data class group 1 402 and data class group 3 406) of the 20 different data class groups correspond to a particular column of the data asset, then the data class manager only runs the data classes included in those 2 data class groups against that particular column of the data asset. Thus, the data class manager using the new data class analysis of illustrative embodiments decreases the total number of data classes needed to be run against columns of the data asset and, therefore, increases system performance.

With reference now to FIG. 5, a diagram illustrating an example of a data class scoring process is depicted in accordance with an illustrative embodiment. Data class scoring process 500 may be implemented in a computer, such as, for example, data governance server 104 in FIG. 1 or data processing system 200 in FIG. 2. For example, data class scoring process 500 may be implemented in data class manager 218 in FIG. 2.

In this example, data class scoring process 500 includes data asset identifier 502, column identifier 504, data class 506, data class score for matching rows of column 508, and referenced columns 510. Data asset identifier 502 uniquely identifies the data asset being analyzed, which in this example is Table A. Column identifier 504 uniquely identifies each of the columns of Table A. Data class 506 identifies the data class that matches data in the corresponding column (e.g., DC1 matches the data in column 1). Data class score for matching rows of column 508 provides the number of rows that match the data class of the corresponding column. Referenced columns 510 identify the same columns of data of the corresponding column that are located in different data assets (e.g., columns 9, 10, and 11 of different assets contain the same data as column 1 in Table A).

In this example, assume 60,000 rows of data exist in column 1 of Table A. The data class manager determines that 50000 rows of column 1 match DC1. As a result, data class score for matching rows of column 508 indicates that the data class score corresponding to column 1 is 50000 for DC1. Also in this example, the data class manager determines that 3000 rows in column 1 match DC2. Consequently, data class score for matching rows of column 508 indicates that another data class score corresponding to column 1 is 3000 for DC2.

This is an example of how the data class manager generates the data class score using the new data class analysis process of illustrative embodiments. The data class manager first selects column 1 of Table A. The data class manager then retrieves each respective row of data in column 1. In addition, the data class manager retrieves all data classes in a data class score repository, such as, for example, data class score repository 302 in FIG. 3, for column 1 ordered by data class score. Illustrative embodiments then run the new data class analysis process. When a row of data in column 1 matches a particular data class (e.g., DC1) while the data class manager is performing the new data class analysis, the data class manager adds 1 to the data class score value corresponding to column 1 for that particular data class (e.g., DC1). The data class manager continues the matching process for each row of each respective column in Table A. As a result, the data class manager continues to build and update the data class score repository over time.

Figure 6:
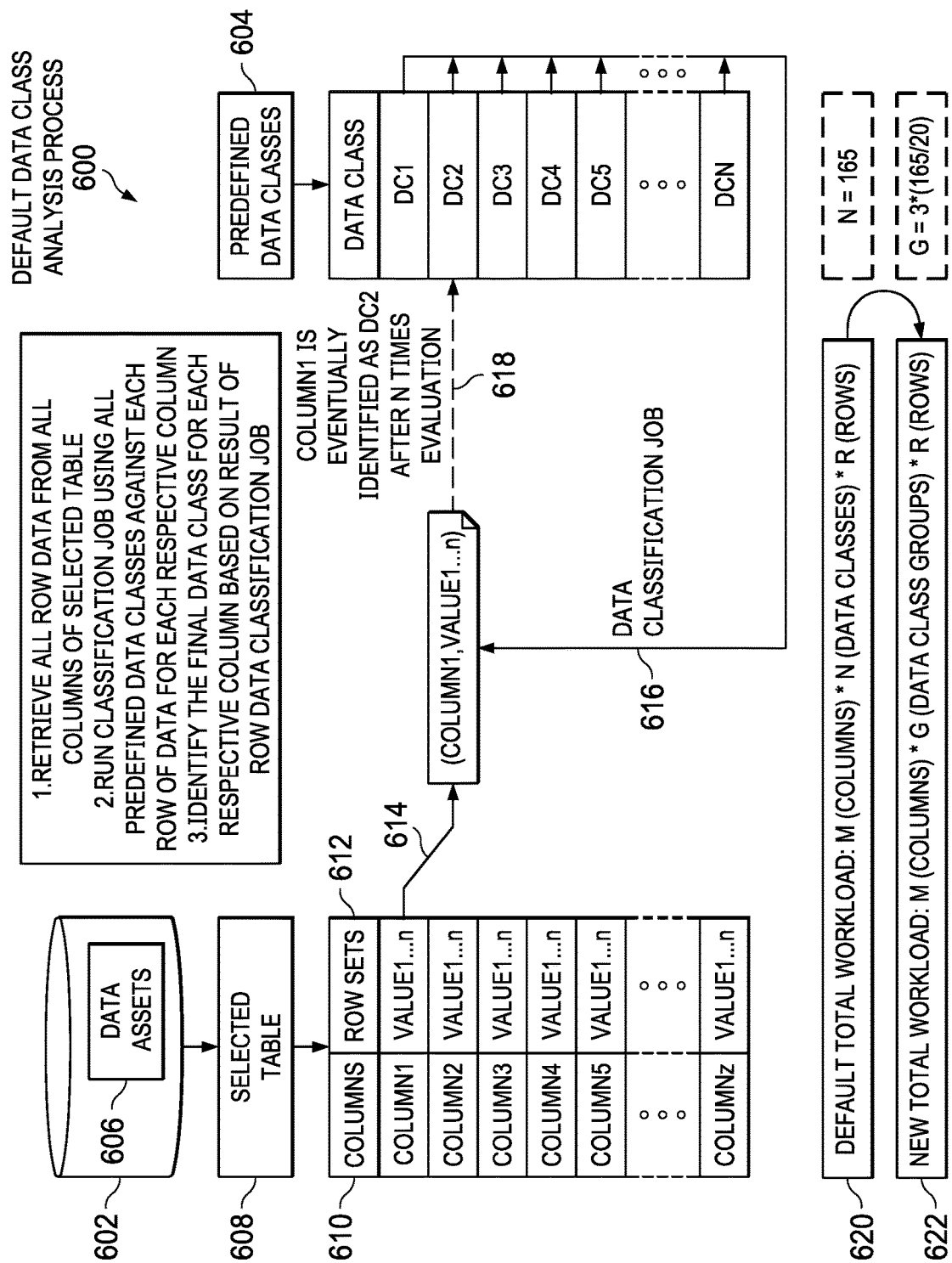
FIG. 6 is a diagram illustrating an example of a default data class analysis process in accordance with an illustrative embodiment.

With reference now to FIG. 6, a diagram illustrating an example of a default data class analysis process is depicted in accordance with an illustrative embodiment. Default data class analysis process 600 may be implemented in a computer, such as, for example, data governance server 104 in FIG. 1 or data processing system 200 in FIG. 2. For example, default data class analysis process 600 may be implemented in data class manager 218 in FIG. 2.

In this example, default data class analysis process 600 includes storage 602 and predefined data classes 604. Storage 602 may be, for example, storage 108 in FIG. 1. Predefined data classes 604 may be, for example, data classes 306 in FIG. 3 or data classes 506 in FIG. 5. N number of predefined data classes exist, where N equals 165 in this example. It should be noted that predefined data classes 604 may be stored in storage 602, along with data assets 606, or may be stored in the data processing system, itself.

The data class manager retrieves selected table 608 (e.g., Table A) from data assets 606 in response to a user input. Selected table 608 is comprised of columns 610 and row sets 612. In other words, Table A contains M number of columns and R number of rows of data.

In response to the data class manager not matching a data class to a particular column of selected table 608, the data class manager utilizes default data class analysis process 600. At 614, the data class manager retrieves each column of selected table 608 (e.g., Table A) when performing data classification job 616 (i.e., the default data class analysis). Further, the data class manager retrieves each respective row of each respective column. The data class manager also retrieves each data class of predefined data classes 604 and then runs each data class against each respective row of each respective column to determine whether data in a particular row of a column matches a particular data class. The time complexity to run default data class analysis process 600 is M (columns)*N (data classes)*R (rows)=Total System Workload. At 618, the data class manager identifies column 1 as DC2 after N times evaluation.

Now comparing default data class analysis process 600 with the new data class analysis process of illustrative embodiments, such as, for example, new data class analysis process 300 in FIG. 3, Default Total System Workload 620 for default data class analysis process 600 is equal to M (columns)*N (data classes)*R (rows), where N equals 165. In contrast, New Total System Workload 622 for the new data class analysis of illustrative embodiments is equal to M (columns)*G (data class groups)*R (rows), assuming the 165 data classes are divided into the 20 different data class groups and a particular column matches 3 data class groups. Each data class group includes approximately 165/20 data classes. As a result, in this example, G equals 3*(165/20). Thus, the new data class analysis of illustrative embodiments decreases the number of data classes that need to be run against columns of a data asset, improving system performance.

With reference now to FIG. 7, a diagram illustrating an example of a column data class analysis result is depicted in accordance with an illustrative embodiment. Column data class analysis result 700 may be implemented in a computer, such as, for example, data governance server 104 in FIG. 1 or data processing system 200 in FIG. 2. For example, column data class analysis result 700 may be implemented in data class manager 218 in FIG. 2.

In this example, column data class analysis result 700 includes data asset identifier 702, column identifier 704, and identified data class for column 706. Data asset identifier 702, column identifier 704, and identified data class for column 706 may be, for example, data asset identifier 502, column identifier 504, and data class 506 in FIG. 5. Identified data class for column 706 includes data class confidence value 708 (e.g., a % value) for each respective data class, which corresponds to a matched column. The data class manager generates data class confidence value 708 for each matched data class to a particular column. Data class confidence value 708 indicates a degree of confidence that the data class manager correctly assigned a particular data class to a column. The data class manager may utilize a minimum data class confidence threshold level (e.g., 70%) to determine whether a particular data class should be assigned to a particular column.

Figure 8A:
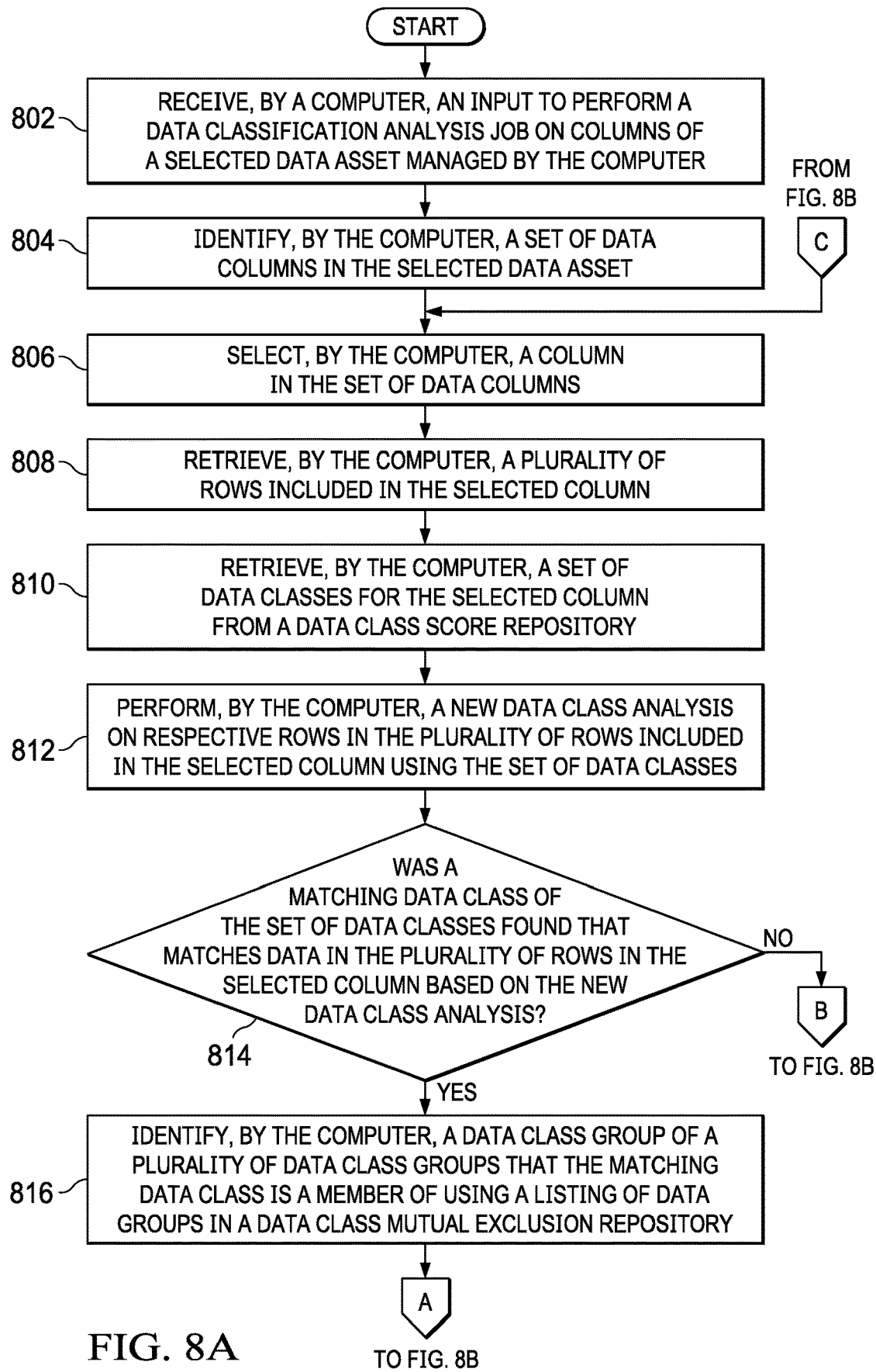
FIGS. 8A-8B are a flowchart illustrating a process for mutual exclusion data class analysis in accordance with an illustrative embodiment.
Figure 8B:
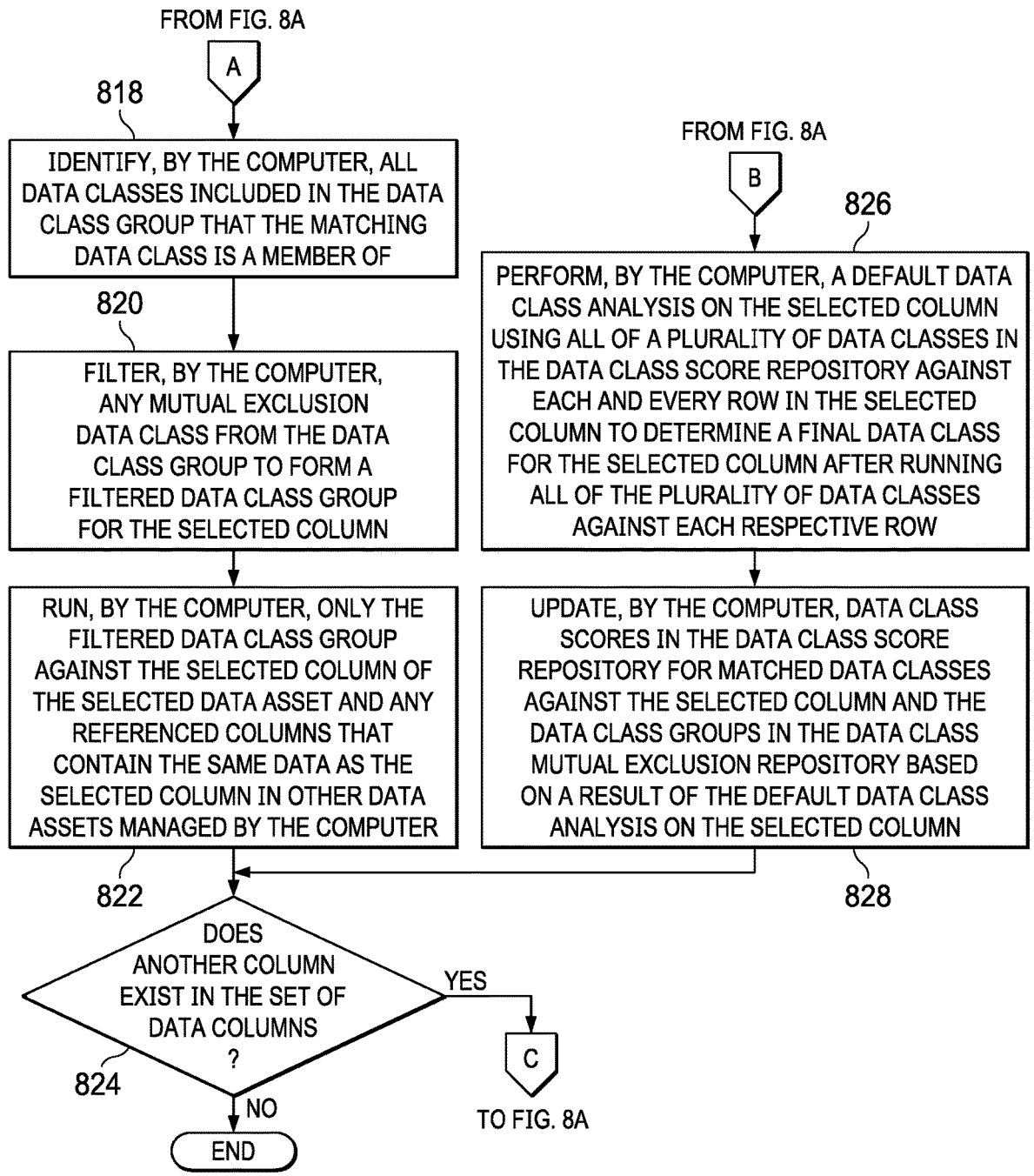

With reference now to FIGS. 8A-8B, a flowchart illustrating a process for mutual exclusion data class analysis is shown in accordance with an illustrative embodiment. The process shown in FIGS. 8A-8B may be implemented in a computer, such as, for example, data governance server 104 in FIG. 1 or data processing system 200 in FIG. 2. For example, the process shown in FIGS. 8A-8B may be implemented in data class manager 218 in FIG. 2.

The process begins when the computer receives an input to perform a data classification analysis job on columns of a selected data asset managed by the computer (step 802). In response to receiving the input, the computer identifies a set of data columns in the selected data asset (step 804). Afterward, the computer selects a column in the set of data columns (step 806). In addition, the computer retrieves a plurality of rows included in the selected column (step 808). Further, the computer retrieves a set of data classes for the selected column from a data class score repository (step 810).

Subsequently, the computer performs a new data class analysis on respective rows in the plurality of rows included in the selected column using the set of data classes retrieved from the data class score repository for the selected column (step 812). The computer makes a determination as to whether a matching data class of the set of data classes was found that matches data in the plurality of rows in the selected column based on the new data class analysis (step 814).

If the computer determines that a matching data class of the set of data classes was found that matches the data in the plurality of rows in the selected column based on the new data class analysis, yes output of step 814, then the computer identifies a data class group of a plurality of data class groups that the matching data class is a member of using a listing of data groups in a data class mutual exclusion repository (step 816). The computer also identifies all data classes included in the data class group that the matching data class is a member of (step 818). Furthermore, the computer filters any mutual exclusion data class from the data class group to form a filtered data class group for the selected column (step 820). Moreover, the computer only runs the filtered data class group against the selected column of the selected data asset and any referenced columns that contain the same data as the selected column in other data assets managed by the computer (step 822). As a result, the computer decreases processing time and resource utilization of the computer by only running the filtered data class group against the selected column of the selected data asset and any referenced columns that contain the same data as the selected column in other data assets managed by the computer. Thus, performance of the computer, itself, is improved. In addition, the computer updates data class scores in the data class score repository based on running the filtered data class group against the selected column. Afterward, the computer makes a determination as to whether another column exists in the set of data columns (step 824). If the computer determines that another column does exist in the set of data columns, yes output of step 824, then the process returns to step 806 where the computer selects another column in the set of data columns. If the computer determines that another column does not exist in the set of data columns, no output of step 824, then the process terminates thereafter.

Returning again to step 814, if the computer determines that no matching data class of the set of data classes was found that matches the data in the plurality of rows in the selected column based on the new data class analysis, no output of step 814, then the computer performs a default data class analysis on the selected column using all of a plurality of data classes in the data class score repository against each and every row in the selected column to determine a final data class for the selected column after running all of the plurality of data classes against each respective row (step 826). The computer updates the data class scores in the data class score repository for matched data classes against the selected column and also updates the data class groups in the data class mutual exclusion repository based on a result of the default data class analysis on the selected column (step 828). Thereafter, the process returns to step 824 where the computer makes a determination as to whether another column exists in the set of data columns.

Thus, illustrative embodiments of the present invention provide a computer-implemented method, computer system, and computer program product for performing a mutual exclusion data class analysis in data governance by building data class groups, which are used to identify mutual exclusion data classes that are not needed to be run on a particular column of data, to improve system performance during data classification of data assets. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing a mutual exclusion data class analysis, the computer-implemented method comprising:
   identifying, by a computer, a data class group of a plurality of data class groups that a matching data class is a member of, the matching data class matches data in a plurality of rows of a column in a data asset;
   identifying, by the computer, data classes included in the data class group that the matching data class is a member of;
   filtering, by the computer, a mutual exclusion data class from the data class group to form a filtered data class group for the column; and
   running, by the computer, the filtered data class group against the column of the data asset decreasing processing time and resource utilization of the computer.

2. The computer-implemented method of claim 1 further comprising:
   identifying, by the computer, a set of data columns in the data asset in response to receiving an input to perform a data classification analysis job on columns of the data asset managed by the computer;

selecting, by the computer, the column in the set of data columns;

retrieving, by the computer, the plurality of rows included in the column; and retrieving, by the computer, a set of data classes for the column from a data class score repository comprising data class scores representing numerical scores of the data classes that correspond to different columns of data in the data asset, wherein a given data class score of the data class scores is based on a number of rows for a given column of the data asset that matches a particular data class.

3. The computer-implemented method of claim 2, wherein the set of data classes for the column designate a type of data contained in the column, and further comprising:

performing, by the computer, a data class analysis on respective rows in the plurality of rows included in the column using the set of data classes retrieved from the data class score repository for the column;

determining, by the computer, whether the matching data class of the set of data classes was found that matches the data in the plurality of rows in the column based on the data class analysis; and identifying, by the computer, the data class group of the plurality of data class groups that the matching data class is a member of in response to the computer determining that the matching data class of the set of data classes was found that matches the data in the plurality of rows in the column based on the data class analysis.

4. The computer-implemented method of claim 3, wherein the data asset comprises a relational data table comprised of columns and rows, and further comprising:

performing, by the computer, a default data class analysis on the column using a plurality of data classes in a data class score repository against each respective row in the column to determine a final data class for the column after running all of the plurality of data classes against each respective row in response to the computer determining that no matching data class of the set of data classes was found that matches the data in the plurality of rows in the column based on the data class analysis; and updating, by the computer, data class scores in the data class score repository for matched data classes against the column and the data class groups based on result of the default data class analysis on the column.

5. The computer-implemented method of claim 1, wherein the data class group represents a group of related data classes of the data classes, and further comprising:

running, by the computer, the filtered data class group against referenced columns that contain same data as the column in other data assets managed by the computer.

6. The computer-implemented method of claim 1, wherein an exclusive relationship exists between two data classes when a first data class matches a particular column and the computer will not run a second data class against that particular column because the first data class and the second data class describe a same type of data, and wherein the second data class is the mutual exclusion data class.

7. The computer-implemented method of claim 1, wherein the computer utilizes a minimum data class confidence threshold level to determine whether a particular data class should be assigned to a particular column of the data asset.

8. A computer system for performing a mutual exclusion data class analysis, the computer system comprising:

a bus system;

a storage device connected to the bus system, wherein the storage device stores program instructions; and a processor connected to the bus system, wherein the processor executes the program instructions to:

identify a data class group of a plurality of data class groups that a matching data class is a member of, the matching data class matches data in a plurality of rows of a column in a data asset;

identify data classes included in the data class group that the matching data class is a member of;

filter a mutual exclusion data class from the data class group to form a filtered data class group for the column; and run the filtered data class group against the column of the data asset decreasing processing time and resource utilization of the computer system.

9. The computer system of claim 8, wherein the processor further executes the program instructions to:

identify a set of data columns in the data asset in response to receiving an input to perform a data classification analysis job on columns of the data asset managed by the computer system;

select the column in the set of data columns;

retrieve the plurality of rows included in the column; and retrieve a set of data classes for the column from a data class score repository comprising data class scores representing numerical scores of the data classes that correspond to different columns of data in the data asset, wherein a given data class score of the data class scores is based on a number of rows for a given column of the data asset that matches a particular data class.

10. The computer system of claim 9, wherein the set of data classes for the column designate a type of data contained in the column, and wherein the processor further executes the program instructions to:

perform a data class analysis on respective rows in the plurality of rows included in the column using the set of data classes retrieved from the data class score repository for the column;

determine whether the matching data class of the set of data classes was found that matches the data in the plurality of rows in the column based on the data class analysis; and identify the data class group of the plurality of data class groups that the matching data class is a member of in response to determining that the matching data class of the set of data classes was found that matches the data in the plurality of rows in the column based on the data class analysis.

11. The computer system of claim 10, wherein the data asset comprises a relational data table comprised of columns and rows, and wherein the processor further executes the program instructions to:

perform a default data class analysis on the column using a plurality of data classes in a data class score repository against each respective row in the column to determine a final data class for the column after running all of the plurality of data classes against each respective row in response to determining that no matching data class of the set of data classes was found that matches the data in the plurality of rows in the column based on the data class analysis; and update data class scores in the data class score repository for matched data classes against the column and the data class groups based on result of the default data class analysis on the column.

12. The computer system of claim 8, wherein the data class group represents a group of related data classes of the data classes, and wherein the processor further executes the program instructions to:

run the filtered data class group against referenced columns that contain same data as the column in other data assets managed by the computer system.

13. The computer system of claim 8, wherein an exclusive relationship exists between two data classes when a first data class matches a particular column and the computer system will not run a second data class against that particular column because the first data class and the second data class describe a same type of data, and wherein the second data class is the mutual exclusion data class.

14. A computer program product for performing a mutual exclusion data class analysis, the computer program product comprising a computer-readable storage medium having program instructions embodied therewith, the program instructions executable by a computer to cause the computer to perform a method of:

identifying, by the computer, a data class group of a plurality of data class groups that a matching data class is a member of, the matching data class matches data in a plurality of rows of a column in a data asset;

identifying, by the computer, data classes included in the data class group that the matching data class is a member of;

filtering, by the computer, a mutual exclusion data class from the data class group to form a filtered data class group for the column; and running, by the computer, the filtered data class group against the column of the data asset decreasing processing time and resource utilization of the computer.

15. The computer program product of claim 14 further comprising:

identifying, by the computer, a set of data columns in the data asset in response to receiving an input to perform a data classification analysis job on columns of the data asset managed by the computer;

selecting, by the computer, the column in the set of data columns;

retrieving, by the computer, the plurality of rows included in the column; and retrieving, by the computer, a set of data classes for the column from a data class score repository comprising data class scores representing numerical scores of the data classes that correspond to different columns of data in the data asset, wherein a given data class score of the data class scores is based on a number of rows for a given column of the data asset that matches a particular data class.

16. The computer program product of claim 15, wherein the set of data classes for the column designate a type of data contained in the column, and further comprising:

performing, by the computer, a data class analysis on respective rows in the plurality of rows included in the column using the set of data classes retrieved from the data class score repository for the column;

determining, by the computer, whether the matching data class of the set of data classes was found that matches the data in the plurality of rows in the column based on the data class analysis; and identifying, by the computer, the data class group of the plurality of data class groups that the matching data class is a member of in response to the computer determining that the matching data class of the set of data classes was found that matches the data in the plurality of rows in the column based on the data class analysis.

17. The computer program product of claim 16, wherein the data asset comprises a relational data table comprised of columns and rows, and further comprising:

performing, by the computer, a default data class analysis on the column using a plurality of data classes in a data class score repository against each respective row in the column to determine a final data class for the column after running all of the plurality of data classes against each respective row in response to the computer determining that no matching data class of the set of data classes was found that matches the data in the plurality of rows in the column based on the data class analysis; and updating, by the computer, data class scores in the data class score repository for matched data classes against the column and the data class groups based on result of the default data class analysis on the column.

18. The computer program product of claim 14, wherein the data class group represents a group of related data classes of the data classes, and further comprising:

running, by the computer, the filtered data class group against referenced columns that contain same data as the column in other data assets managed by the computer.

19. The computer program product of claim 14, wherein an exclusive relationship exists between two data classes when a first data class matches a particular column and the computer will not run a second data class against that particular column because the first data class and the second data class describe a same type of data, and wherein the second data class is the mutual exclusion data class.

20. The computer program product of claim 14, wherein the computer utilizes a minimum data class confidence threshold level to determine whether a particular data class should be assigned to a particular column of the data asset.

* * * * *